US009340978B2

(12) United States Patent
Naito

(10) Patent No.: US 9,340,978 B2
(45) Date of Patent: May 17, 2016

(54) DUCTILE CHORD CONNECTORS FOR USE IN CONCRETE RODS IN STRUCTURES

(75) Inventor: Clay Naito, Bethlehem, PA (US)

(73) Assignee: Lehigh University, Bethlehem, PA (US)

(*) Notice: Subject to any disclaimer, the term of this patent is extended or adjusted under 35 U.S.C. 154(b) by 0 days.

(21) Appl. No.: 14/346,372

(22) PCT Filed: Apr. 18, 2012

(86) PCT No.: PCT/US2012/034078
§ 371 (c)(1),
(2), (4) Date: Mar. 21, 2014

(87) PCT Pub. No.: WO2013/043233
PCT Pub. Date: Mar. 28, 2013

(65) Prior Publication Data
US 2014/0230360 A1 Aug. 21, 2014

Related U.S. Application Data

(60) Provisional application No. 61/537,216, filed on Sep. 21, 2011.

(51) Int. Cl.
E04C 5/16 (2006.01)
E04G 21/12 (2006.01)

(52) U.S. Cl.
CPC ............. E04C 5/162 (2013.01); E04C 5/163 (2013.01); E04G 21/12 (2013.01); Y10T 29/49826 (2015.01); Y10T 403/3933 (2015.01)

(58) Field of Classification Search
CPC . F16L 43/02; Y10T 29/49739; Y10T 29/403; Y10T 29/477; Y10T 403/551; Y10T 403/3933; Y10T 29/49826; E04B 1/41; E04B 1/215; E04B 5/023; E04C 5/162; E04C 5/163; E04G 21/12

USPC .......... 52/223.1, 223.6, 223.7, 223.8, 223.11, 52/223.9, 223.13, 223.14
See application file for complete search history.

(56) References Cited

U.S. PATENT DOCUMENTS 3,469,952 A * 9/1969 Baker ........................... 428/614
3,593,532 A * 7/1971 Grazel ......................... 405/252
(Continued)

FOREIGN PATENT DOCUMENTS

CN 203633261 U * 6/2014
DE 102010017046 A1 * 11/2011 ............. E01C 11/14
(Continued)

OTHER PUBLICATIONS

International Search Report for PCT/US2012/34078, filed Apr. 18, 2012. (WO).

Primary Examiner — Jeanette E Chapman
(74) Attorney, Agent, or Firm — Kilpatrick Townsend & Stockton LLP

(57) ABSTRACT

Provided herein are connectors for use in assembling reinforced concrete structures, as well as methods of assembly using the connectors. In one embodiment, the connectors and methods provide for secure and easy connection to the butt end of any rebar rod, as well as attachment of an opposite end to another metal structure. For example, a butt portion of a connector slides over the butt portion of a rebar rod, and can include one or more sidewall openings to allow welding onto rebar that is enclosed within the butt portion of the connector. The opposite second end can include a faceplate for attaching a weld plate, thus permitting a series of connections using connectors and weld plates, among other things. The connectors provide selected properties that differ from the rebar, welds, and weld plates, such as stretch, yield strength, ultimate strength, and transfer of stress and vibration, among other things.

27 Claims, 7 Drawing Sheets

(56) References Cited

U.S. PATENT DOCUMENTS

| | | | | |
|---|---|---|---|---|
| 3,963,450 | A | * | 6/1976 | Davies ........................ 428/594 |
| 4,070,043 | A | * | 1/1978 | Becker ................. F16L 39/005 |
| | | | | 285/123.1 |
| 4,200,218 | A | * | 4/1980 | Koehler ............... E21B 43/088 |
| | | | | 228/165 |
| 4,445,617 | A | * | 5/1984 | Elliott ..................... B61G 9/12 |
| | | | | 105/420 |
| 4,781,006 | A | * | 11/1988 | Haynes ................ E04B 1/215 |
| | | | | 52/583.1 |
| 4,959,940 | A | * | 10/1990 | Witschi ....................... 52/583.1 |
| 5,561,956 | A | * | 10/1996 | Englekirk ............... E04B 1/41 |
| | | | | 411/383 |
| 5,636,867 | A | * | 6/1997 | McNabb ............. B60R 21/131 |
| | | | | 180/89.12 |
| 6,185,897 | B1 | | 2/2001 | Johnson et al. |
| 7,171,787 | B2 | * | 2/2007 | Thomason et al. .......... 52/169.7 |
| 7,878,730 | B2 | * | 2/2011 | Weaver ........................ 403/305 |
| 8,468,766 | B1 | * | 6/2013 | Keenan ........................ 52/583.1 |
| 2003/0223825 | A1 | | 12/2003 | Timmons et al. |
| 2004/0231125 | A1 | * | 11/2004 | Shah ..................... B21D 39/04 |
| | | | | 29/421.1 |
| 2009/0162138 | A1 | * | 6/2009 | Burger .................. B62D 21/02 |
| | | | | 403/271 |
| 2011/0036049 | A1 | | 2/2011 | Olivia et al. |

FOREIGN PATENT DOCUMENTS

| | | | | |
|---|---|---|---|---|
| GB | 1048203 | A | * 11/1966 | ............. H01R 4/00 |
| GB | 2131725 | A | * 6/1984 | ............ B23K 31/02 |
| KR | 10-2009-0126076 | | 12/2009 | |
| KR | WO 2015076429 A1 | * | 5/2015 | ............... E04C 5/03 |

* cited by examiner

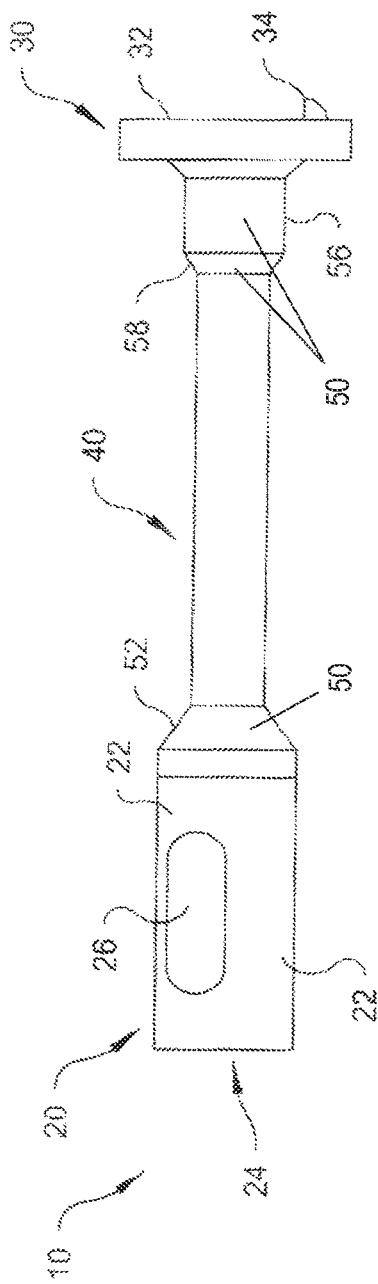
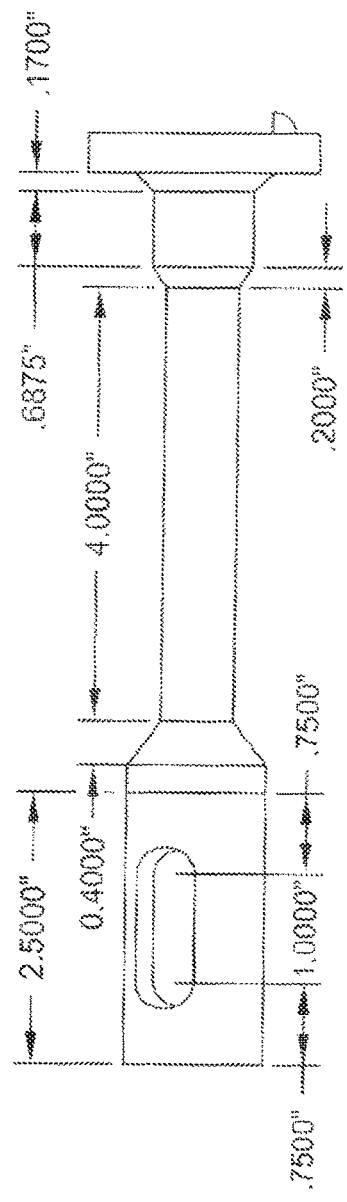

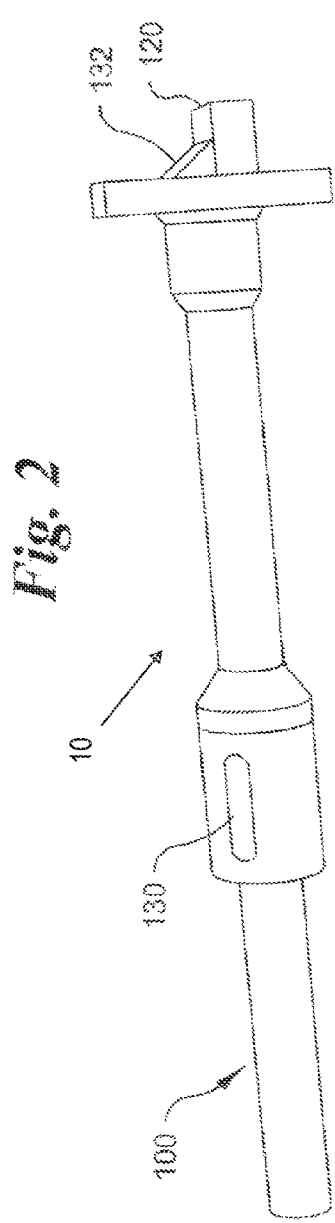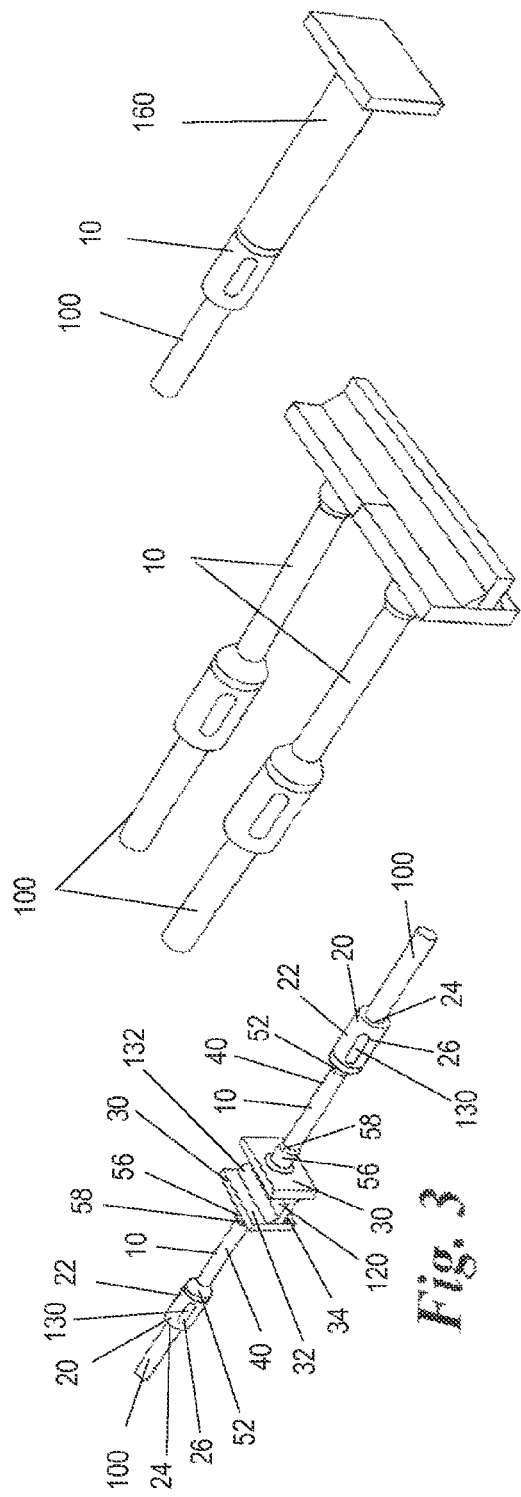

DUCTILE CHORD CONNECTORS FOR USE IN CONCRETE RODS IN STRUCTURES

CROSS REFERENCE TO RELATED APPLICATIONS

This application claims the benefit of U.S. Provisional Application No. 61/537,216 filed Sep. 21, 2011.

BACKGROUND OF THE INVENTION

This invention relates to connectors for use in construction of buildings, highways, and other heavy structures, and more particularly to ductile chord connectors for use in connecting structural and reinforcing rods in construction, such as in precast concrete assemblies, as well as to connect the terminal ends of rods in and between any structures.

Typically, concrete structures include reinforcing elements, such as steel rods, commonly referred to as "rebar". Increasingly, structures are being assembled using precast, reinforced (such as with metal reinforcing bar, also known as "rebar") concrete modular assemblies. Such precast assemblies are typically connected to one another by embedding steel plates in the precast component and welding the adjacent embeds together when (or after) the precast pieces are installed next to each other. Existing embeds are fabricated from steel plates welded to rebar. These connections do not provide desirable flexibility and desired movement between and among the precast structures. For example, continuous precast highway bridge sections must be permitted to stretch while maintaining integrity under thermal variations as the precast elements expand and contract over the day and the year. Similarly, reinforced concrete and precast concrete building assemblies are subjected to wind sway, weight of building contents, and must also be able to move or bend while supporting the load. Additionally, naturally occurring forces, such as earthquakes, hurricanes, tornadoes, exacerbate the load forces on and between precast structure subassemblies. Known connection assemblies, such as the welded plate and rebar joint assemblies previously described herein, fail in a brittle manner in such conditions. Moreover, the failure of known connection assemblies inflicts undesired damage to the surrounding concrete, rebar and other components of concrete and precast concrete assemblies. Indeed, the variability in known connection assemblies, including the welding, weld plate, and rebar, as well as field assembly variability, makes the failure point of known connection assemblies unpredictable, uncontrolled, and even dangerous.

For all these reasons, there exists a continuing need for connectors for use in joining reinforced concrete assemblies, whether field cast or precast, as well as for connecting steel rods in any construction environment to overcome the disadvantages of the known prior art.

BRIEF DESCRIPTION OF THE DRAWINGS

The present invention will hereinafter be described in conjunction with the appended drawing figures wherein like numerals denote like elements.

FIG. 1a is component side view of a chord connecter in one embodiment in accordance with the present invention.

FIG. 1b is a dimensioned side view of a chord connecter in one embodiment in accordance with the present invention.

FIG. 2 is a perspective view of a chord connecter and rebar and portion of the weld plate assembly in one embodiment in accordance with the present invention.

FIG. 3 is a perspective view of two opposed chord connecters adjoined to rebar and weld plate assemblies in one embodiment in accordance with the present invention.

FIG. 4 is a perspective view of two axially aligned adjacent chord connecters adjoined to rebar and weld plate assemblies in one embodiment in accordance with the present invention.

FIG. 5 is a perspective view of a connector with a sheath assembly in accordance with the present invention.

FIG. 9 is a graph depicting the designed yield locations and materials in a preferred embodiment of the connector of the present invention.

SUMMARY OF THE INVENTION

Figure 6:
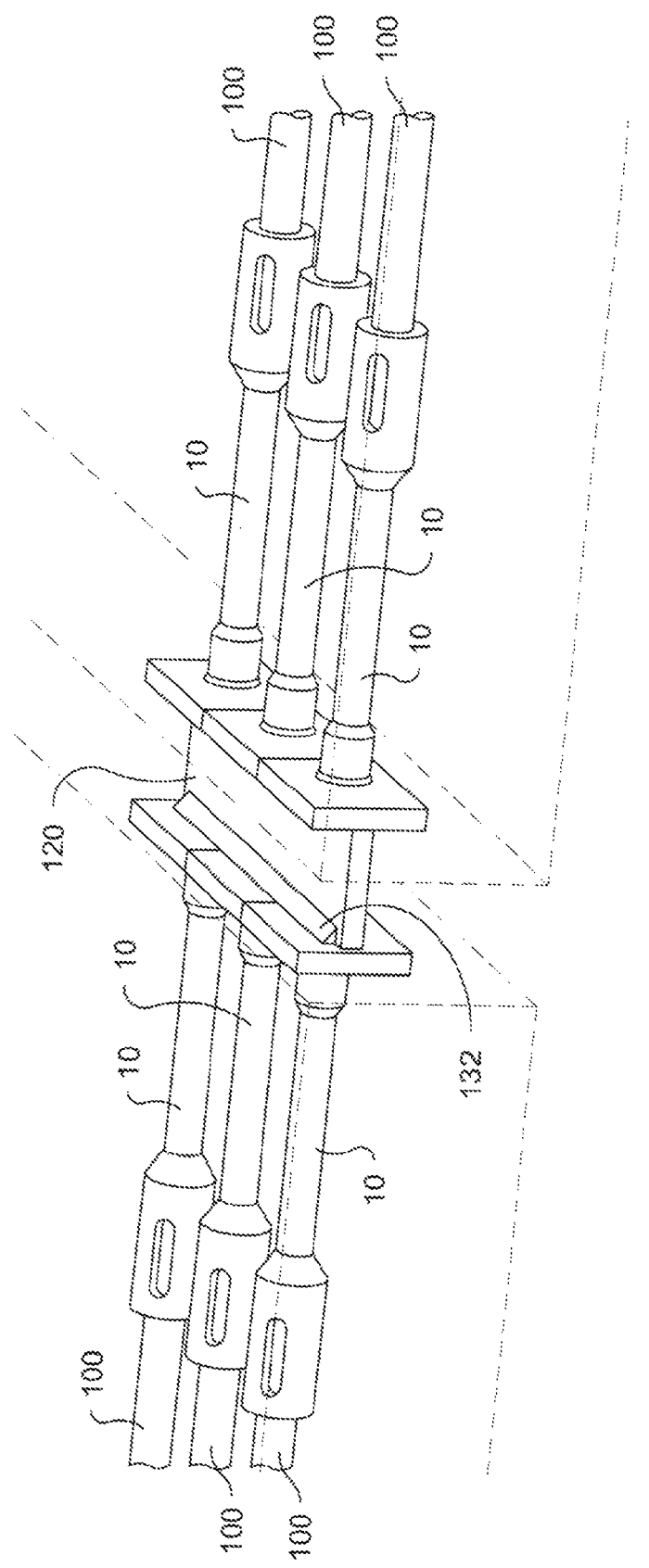
FIG. 6 is a perspective view, partially in section, of a series of opposed connectors and axially aligned adjacent connectors in accordance with the present invention.

Provided herein are connectors for use in assembling reinforced concrete structures, as well as methods of assembly using the connectors. In one embodiment, the connectors and methods provide for secure and easy connection to the butt end of any rebar rod, as well as attachment of an opposite end to another metal structure. For example, a butt portion of a connector slides over the butt portion of a rebar rod, and can include one or more sidewall openings to allow welding onto rebar that is enclosed within the butt portion of the connector. The opposite second end can include a faceplate for attaching a weld plate, thus permitting a series of connections using connectors and weld plates, among other things. The connectors provide selected properties that differ from the rebar, welds, and weld plates, such as stretch, yield strength, ultimate strength, and transfer of stress and vibration, among other things.

In one embodiment, a connector is provided for joining two rods in a structure, such as in a metal reinforced concrete structure. In an example, the connector comprises a sidewall forming a first tube end, the first tube end having a first opening configured for receiving and securing the terminal end of a first reinforcing rod. The; the sidewall further including a second end disposed opposite the first tube end; the sidewall further comprises a middle portion connecting the first end and the second end. The second end includes means for attachment to a metal structure. The middle portion is selected to provide at least one property that differs from the properties of the connector first tube end and connector second end. For example, the at least one property can be selected from the group consisting of: stretch, flexibility, strength, failure, transferred stress, and transferred vibration, among other things.

In another embodiment, a cast concrete assembly is provided, the assembly comprising at least one connector as claimed.

In still another embodiment, a method is provided for joining two metal reinforcement rods, such as for use in a reinforced concrete assembly. In this example, the method includes the steps of; a) providing the connector of claim 1; b)

providing a first metal reinforcement bar having an exposed terminal end; c) connecting the first end of the connector of claim 1 to the exposed terminal end of the first reinforcement rod; d) providing a second reinforcement rod having an exposed terminal end; and e) connecting the second end of the connector of claim 1 to the exposed terminal end of the second reinforcement rod, thereby forming a secure connection between the first reinforcement rod and the second reinforcement rod. Still other embodiments will be apparent from the description, drawings, and claims herein.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features. Further, as used herein, "bar" and "rod" include elongate members of any shape or geometrical cross-section, including but not limited to any structural skeleton and/or reinforcing member such as wires, rods, cylinders, angle-iron, having any shaped cross-section taken perpendicular to an elongate axis such as a longitudinal axis of a rod. It is understood that the preferred connector embodiments herein include a "tube end" that can be of any shape or size and that preferably generally matches the shape of a terminal end of a rod so as to permit the tube-end to engage the rod and to secure the rod to said tube end. Moreover, a "tube end" need not comprise a closed sidewall as illustrated in the preferred embodiments herein, but may comprise one or more partial sidewall portions that engage the rod surface, whether by surrounding it or simply providing adequate contact to accomplish the objectives described and claimed herein. Further, if hollow reinforcing rods are provided, the "tube end" may include a sidewall portion adapted to insert into the hollow rod, for example. In this manner, "tube end" is not intended to be limiting of the inventive connectors conceived by the inventor.

Novel connectors, as well as methods of assembly, are provided herein. The connectors and methods overcome the disadvantages of the prior art in many ways.

For example, the connectors provide a uniform apparatus for secure and easy connection to the butt end of any rebar rod. This feature is accomplished by providing a butt portion of a connector that slides over the butt portion of a rebar rod. In some embodiments, the butt portion of the connector includes one or more sidewall openings to allow welding onto the rebar that is enclosed within the butt portion of the connector. In this manner, the surface area of welded contact between the rebar and the connector exceeds the surface area available for the prior art method of welding a plate to the blunt terminal end of rebar. Additionally, this apparatus and method of connection eliminates the possibility of the connector separating from the rebar in a brittle manner. In this regard, the connection between the rebar and the connector is far more stable, durable, and even permanent as compared to the prior art connections and methods previously described herein.

Another advantage of the apparatus and methods herein involves reliability, predictability and designed control of the joint assembly between two reinforced concrete structures. For example, assuming a very secure and permanent weld connection between the connector and the butt portion of rebar, the connector provides features that make the connector and the rest of the joint assembly secure, repeatable, and predictable under varying stresses and loads. For example, as further described herein, the connector includes a faceplate on the end opposite the tube end to enable a secure connection to a weld plate, or directly to the faceplate of an opposite connector in another reinforced concrete assembly. The faceplate may include surface features such as recesses and/or raised ridges for positioning and securely engaging a weld plate, beam, opposite connector, or other structure desirably placed adjacent the faceplate.

Further, assuming a secure connection to rebar on the tube end and connection of another structure to the faceplate, the connector itself includes features to provide for predictable, reliable performance under various stresses. For example, the connector in one embodiment includes a middle portion of reduced cross-sectional area joining the tube and the faceplate end. Preferably, the middle portion has features to meet a selected stress profile. The stress profile is predetermined and selected by a user, and the middle portion is then designed and constructed to meet that profile. The properties of the middle portion are determined by such factors as materials used, shape, thickness, and length, among other things. For example, where the connector is fabricated entirely from steel, the middle portion can be designed to include a narrowed portion that is more flexible, and/or weaker than the secure rebar connection or the secure faceplate connection. In this manner, the middle portion can be designed to stretch, bend, or otherwise adapt to the stresses imparted on the reinforced concrete structure and the joint(s) between that structure and any adjacent structure. Additionally, and optionally, the connector can include one or more transition regions between the tube end and middle portion and/or between the middle portion and the faceplate end. Such transition regions are designed to provide desirable properties to the connector, such as strength, designed failure, reduction of transferred stress, and strength, among other things.

The above advantages and features, among others, will be evident from the following description and appended drawings, as well as the claims.

Referring generally to FIGS. 1-2, a first embodiment of a connector 10 is shown. The connector 10 includes a first end referred to as the tube end 20, and an opposite end referred to as the faceplate end 30, with a middle portion 40 disposed there between. In this embodiment, the connector 10 is configured to include a hollow portion as the tube end 20, a solid middle portion 40, and a solid faceplate end 30. Preferably, the connector is made of weld-compatible metal or metal alloys to permit attachment to steel rebar by welding. However, in some embodiments, the connector may include composite materials and can be attached by non-welding fastening means, such as attachment by adhesives, sonic welding, or bolting. It should be further understood that any number or arrangement of connectors 10 or other components could be used to provide desired structural support and designed performance or failure within joined structures and assemblies, all within the scope of this invention.

Referring back to FIGS. 1-2, the tube end 20 of connector 10 includes features for easy and secure attachment to rebar 100 or other reinforcing elements used in reinforced concrete or other assemblies. In this embodiment, the tube end 20 includes a sidewall 22 that forms a central conduit 24. The shape and size of the conduit 24 is determined by the shape and size of the rebar 100 or other reinforcing element that will be engaged to the connector 10, and particularly to the tube end 20 and sidewall 22. In this example, assuming rebar 100 is generally rod-like, the conduit 24 is generally cylindrical in shape, and has an inner diameter that is slightly larger than the diameter of rebar 100. To attach the connector 10 to rebar 100, the tube end 20 is slid over the butt end of rebar 100 until the depth of conduit 24 is filled by the rebar 100. In the embodiment of FIG. 1, the tube sidewall 22 includes openings such as slot 26 to permit a user to apply a weld, adhesive, or other fastener to engage the rebar 100 and the tube sidewall 22. In one example, as shown in FIG. 2, a slot weld 130 is applied to the rebar 100 through slot 26 until the entire slot 26 is filled. In other examples, a user may drill through the rebar 100 exposed by slot 26, and may insert a bolt, pin, or other fastener to engage the rebar 100 and sidewall 22. In that example, the slot 26 can be sized to match the fastener to prevent any movement of the connector, or alternatively slot 26 can be shaped to allow any selected combination of rotational, axial, or other movement of connector 10 relative to rebar 100.

As shown in FIGS. 1-2, connector 10 includes a faceplate end 30 disposed opposite tube end 20, with a middle portion 40 connecting tube end 20 to faceplate end 30. In this example, middle portion 40 is generally cylindrical and solid in cross-section. However, the cross-sectional shape, thickness, length, and other aspects of middle portion 40 can be selected and fabricated to meet the design requirements of rigidity, flexibility, stretch, strength, designed failure, for each joint connection within a series of connections in adjacent joined reinforced structures.

Optionally, the connector can include one or more transition regions 50 between the middle portion 40 and any tube end 20, and/or between the middle portion 40 and the faceplate end 30. As shown in FIG. 2, a first transition region 52 is provided between tube sidewall 22 and middle portion 40. Among other things, the first transition region 52 provides a secure connection to ensure integrity of the connector 10 under various stresses. The first transition region 52 further provides the advantage of allowing for slight stretch along the longitudinal axis A-A of the connector 10 once encased in concrete, without fracturing the concrete adjacent region 52. A second transition region 58 is provided on the opposite end of middle portion 40, adjacent faceplate end 30. This region 52 provides advantages similar to that of first transition region 52, with the added advantage of permitting a gradual shape transition and stress flow from middle portion 40 to faceplate end 30.

In the example of FIGS. 1-2, a flange transitional region 56 is provided between second transition region 58 and faceplate end 30. This region 56 provides advantages similar to that of first transition region 52 and second transition region 58, with the added advantage of providing a large cross-sectional area adjacent the faceplate end 30 to provide strength and initial resistance to bending under stress.

In the example of FIG. 1-2, faceplate end 30 includes a faceplate surface 32 configured and designed to allow attachment to an adjacent structure. Preferably, the faceplate surface 32 includes one or more surface features such as ridge 34 for securely engaging another member in a structure, such as a weld plate 120. Preferably, the ridge 34 is positioned, sized, and configured so as to support a weld plate or other member in a desired position, and to permit easy welding, such as a fillet weld 132, fastener, or other permanent attachment between any of the ridge 34, surface 32 and weld plate 120 or other adjacent member for easy, durable assembly in the field.

As shown in the examples of FIGS. 3-5, two or more connectors can be joined to provide a durable joint between structures, such as reinforced concrete structures. The number and arrangement of connectors can be varied to accomplish a desired result, such as but not limited to, flexibility, rigidity, modularity, geometry, predictable failure, among other things. In one preferred embodiment, such as that shown in FIG. 3, two connectors 10 are arranged in opposed position so that their faceplate ends 30 are in close enough proximity to allow attachment of the connectors 10 using a weld plate 120 resting on ridges 34 of each faceplate surface 32. A weld 130 is placed to adjoin the weld plate 120 to each faceplate surface 32 and optionally to each ridge 34. As shown in FIG. 4, a plurality of connectors 10 can be placed side by side or otherwise in substantially axially aligned orientations to provide for attachment of a structure through multiple joints.

As shown in FIG. 5, a sheath covering 160 can optionally be provided over the middle portion 40 of connector 10. The sheath covering 160 can be provided for any number of purposes, including but not limited to: corrosion resistance, moisture dispersion, moisture absorption, shock mitigation, and adherence of surrounding concrete, among other things.

As shown in FIG. 6, the use of connectors 10 is particularly adapted to use in interconnecting two large structures, such as concrete reinforced structures, and precast concrete assemblies such as double-tee and hollow core floor systems. As shown in this example, the faceplate ends 30 may include mating surfaces to allow connectors 10 to be placed in axial alignment in very close proximity to one another within a structure. In this example, the faceplate ends 30 of adjacent connectors within a structure form a substantially continuous row that is exposed for easy connection of one or more weld plates 120. As shown, each faceplate end 30 of each connector 10 is attached to the weld plate 120, such as by welding at one or more of the ridge 34 and the connection point of the faceplate surface 32 and weld plate 120. In this example, or any example involving multiple connectors 10, each connector 10 can be selected to have particular and desirable properties such as rigidity, strength, stretch, vibration frequency, failure points, among other things. In this regard, by selecting properties of each connector 10 at each location within a structure, the structure can be designed to perform as desired. For example, connector types and locations can be selected by a user to allow greater stretch at one location among joined structures versus other locations. The properties of each connector 10 therefore impart desired properties to the structures, joints, and/or areas they connect.

Methods of assembly using the connectors 10 are also provided herein. The modular nature of the connectors makes them suitable in any environment where reinforcing rebar or similar reinforcing members are available for connection. In one example, a method of connecting two reinforced concrete structures is provided. A user locates the terminal end of reinforcing bar, such as the exposed end of a rebar rod in a reinforced concrete structure. Note that the structure in some embodiments is a skeleton including one or more rebar structures, with at least one end of at least one rebar rod 100 exposed for attachment to the tube end 20 of a connector 10. The user inserts the tube end 20 over the rebar end, sliding the rebar end into conduit 24 to a desired depth, preferably to the bottom of the conduit adjacent middle portion 40. In some other embodiments, the conduit 24 may contain an insert such as a shock absorbing insert, or air or other inert gas. In such embodiments, the assembly may benefit from desired movement of the insert or connector 10 about the rebar 100.

In other embodiments, the connectors are incorporated by welding to the rebar prior to precast operations, followed by casting of the concrete around the rebar and connector assemblies. In this manner, the connectors are embedded in the precast element, which in turn can be installed in a desired location or structure, and then welded to an adjacent assembly having an exposed rebar, connector, or other metal assembly.

In a method of assembly, a user secures the connector 10 onto the rebar 100, preferably by performing a slot weld 130 onto the rebar 100 through slot 26. Alternatively or additionally, one or more fasteners can be used to connect the tube end 20 to the rebar 100 to form a secure connection. These steps are repeated on rebar 100 at each location where a joint is desired. Note that the user can select among various connectors 10 to provide the desired joint. For example, a user may select among connectors of varying length, thickness, rigidity, flexibility, and other properties to provide a joint assembly having desired properties.

After securing the tube end 20 to a rebar 100 as described above, the connector 10 is cast into a precast component. Once the component is cured it is positioned in the structure in a desired position so that each connector 10 is placed adjacent a location where a joint is desired between or among structures or sub-structures. At each joint location, the user connects the faceplate end 30 to an adjacent structure. For example, a weld plate 120 can be placed atop and/or across one or more ridges 34 on faceplate surfaces 32. Next, a user attaches the weld plate 120 to each connector faceplate surface 32 and/or ridge 34 using any appropriate fastening means. By way of non-limiting example, a fillet weld 132 may be provided to join the connector 10 to a weld plate 120 or other structure. The exposed opposite end of weld plate 120 is then connected to an opposed connector 10 in another structure or sub-structure. This process is repeated until each and every desired joint is completed between and among an assembly of structures. For example, where the structures are modular precast concrete structures, such as concrete decking for buildings or parking garages, a series of panels can be placed and connected by persons skilled in the art of construction using the connectors and methods described herein.

Example Results. The connectors and methods herein provide excellent interconnections in reinforced concrete assemblies and structures. Computer aided drafting and computer aided simulations of various connectors have been conducted by the inventors. Illustrative results of such simulations are illustrated in FIGS. 7-8.

Figure 7:
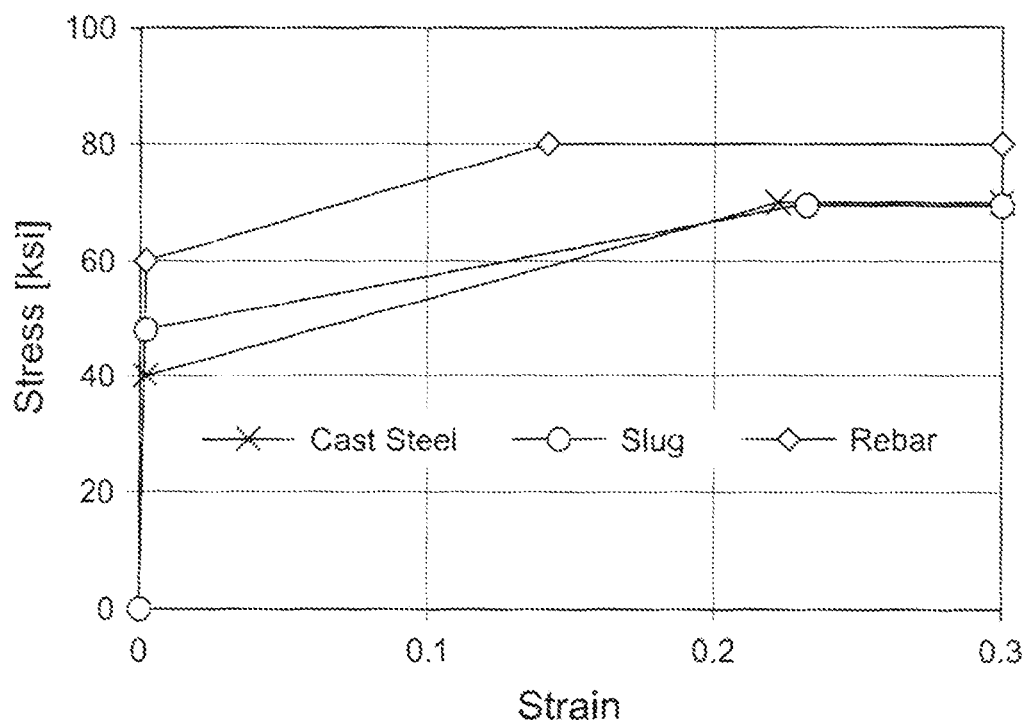
FIG. 7 is a graph depicting properties of construction materials compatible with the connectors and methods of the present invention.
Figure 8:
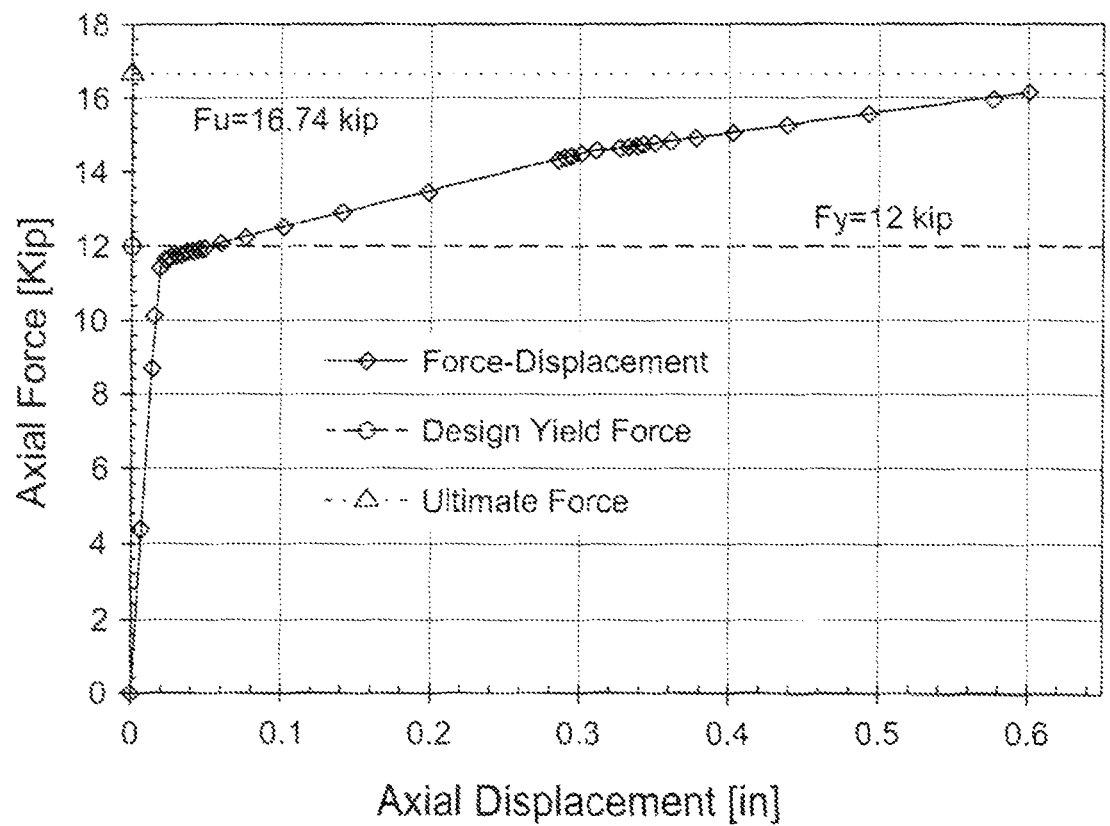
FIG. 8 is a graph depicting properties of additional construction materials compatible with the connectors and methods of the present invention.
Figure 9:
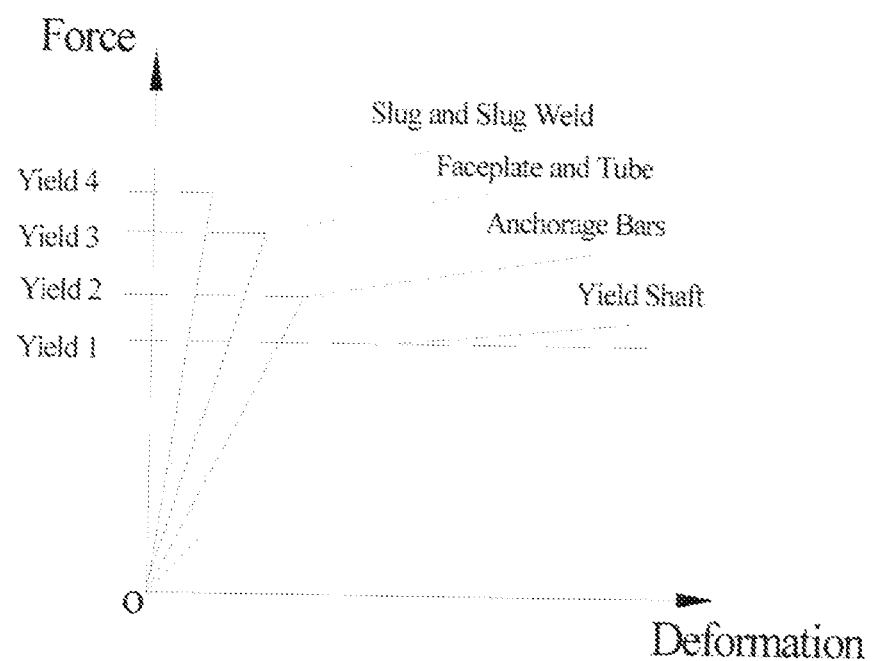
FIG. 9 is a graph depicting performance properties of connectors and assemblies in accordance with the present invention.

For example, FIG. 7 illustrates the designed performance of materials used in reinforcement of concrete building structures. In this example, the strength of rebar, slugs (also known as welding plates) and casting steel (the preferred embodiment of some connectors of the present invention) are illustrated. In particular, the performance of those three materials is illustrated in terms of stress (in ksi, 1000 pounds/sq.in.) and strain (in in./in.) units. As shown, rebar ASTM A706 generally provides a yield strength of about 60 ksi, and an ultimate strength of about 80 ksi. A slug (welding plate) ASTM A36, in turn, generally provides a yield strength of about 48 ksi, and an ultimate strength of about 70 ksi. Lastly, casting steel ASTM A352 LCC generally provides a yield strength of about 40 ksi, and an ultimate strength of about 70 ksi. As shown in FIG. 8, the strength of a weld, such as a fillet weld or slot weld, and a concrete panel, as earlier described herein, are provided. A weld (slot weld or fillet weld) E7018 generally provides a yield strength of about 58 ksi, and an ultimate strength of about 70 ksi. In turn, a concrete panel generally used in precast construction has an elastic modulus of about 4415 psi, a compressive strength of about 6000 psi, and a Poisson's ratio of about 0.2. All of these values assist in calculating the desired properties of a joint in a structure, as well as the failure points within a structure or within a joint. Taking all of these factors into consideration, the inventor has designed a connector with designed properties, such as yield and failure, as generally illustrated in FIG. 9. As shown, the connector is designed to allow its components to yield under stress and strain at predictable loads, and in a particular order to provide unprecedented performance.

By way of further example, the values assist in the design of a connector 10 having desirable properties that accommodate a designed strength, rigidity, elasticity, and/or planned failure of a reinforced structure joined by any number the connectors and methods described herein. For example, as shown in FIG. 9, the connector in a preferred example has a middle portion 40 that is designed to include a region that forms the weakest, most elastic, lowest yield, or otherwise failure point (herein alternatively designated as a "yield shaft"). In an installed connector assembly shown as in FIG. 6, the installation may be designed to have as its next failure point ("yield 2") the anchorage bars or rods, followed by the faceplate and tube end connections ("yield 3"), with the slug weld between the rod and the tube end being the last (or highest) failure point ("yield 4") in the installed assembly. By altering the composition and properties (such as material, size, diameter, etc.) of materials in any assembly that includes the connector 10 itself, a joint may be designed to have predictable, controlled failure, such as to allow the joint to stretch before breaking, thereby preserving the structure from otherwise higher levels of damage in earthquakes, among other things.

FIG. 9 illustrates the performance of an exemplary connector installed in a reinforced structure as described herein. This connection is modeled using the material properties defined in FIG. 7. As shown, the force-displacement performance of the connector achieves a desired level of performance under axial force (in kip (1000 lb) shown along the y axis) as well as an acceptable level of axial displacement (in inches shown along the X axis) under said force.

FIG. 9 illustrates the designed stress distribution in the connector and its connections under axial loading. The stress distribution shows that the high stresses are localized in the middle portion of the connector as designed.

By way of further explanation, a precast panel-to-panel dry chord connection with considerable ductility and predictable strength is required for buildings located in moderate and high seismic regions in accordance with the new proposed diaphragm design methodology. Research on the conventional dry chord connection and enhanced dry chord connection (Cao 2006) indicated that welds used between the bars and between the faceplates are sensitive to premature yielding and fracture. Those premature weld failure modes were observed again during the evaluation of critical flexure multi-connection joint under predefined displacement histories. Due to these failure modes the chord bar strength is not reliably achieved and the prior art connections fail with limited ductility. An innovative dry chord connection with high ductility is desirable, and is developed herein.

In precast concrete diaphragm systems, chord connections are utilized at extreme edges of the diaphragm to resist in-plane diaphragm forces generated during seismic events. This is achieved through a force couple in which the chords provide tension and compression resistance. Conventional construction chord construction is considered "wet" in that it utilizes a field cast element. These "wet" chords can be fabricated by creating a reduced section, pour strip, at the edge of the double tee panel in which longitudinal chord bars can be placed and ready mix concrete is placed. While this "wet" method of construction has been shown to perform well, it requires the use of field cast concrete. In some cases the use of field cast concrete can detract from the quality, increase the construction schedule, and raise the cost of the building.

To eliminate the use of field cast concrete in the precast building a "dry" chord detail is required. A dry chord consists of a connection installed in the panel during precast operation. These dry chords are then interconnected through welding. No cast in-place concrete is used to complete the anchorage. Although the dry chord connection may ease construction schedule and cost, the effectiveness is dependent on the integrity of a potentially brittle weld. Proper design of the connection is critical for ductile response of the diaphragm.

Known current existing dry chord connections consist of bars welded to a faceplate and embedded in a precast double tee (DT) flange. The faceplates in adjacent DT flanges are welded using a steel slug to span the gap and a weld to create a force path.

Previous research conducted on the pre-topped dry chord connections indicated that the resisting force and deformation capacity are reduced significantly due to premature failure of the weld. This section provides a brief background on the issues identified and the research conducted. Experimental studies were conducted on conventional bonded dry chord connections (Naito, C., et al. 2006). The test specimen was fabricated from two #5 bars fillet welded to the exposed face plate and installed in the panel prior to precast operations. During erection, a round or square solid slug was installed between the adjacent face plates and welded in place. To prevent the slug from dropping through to the floor below, the face plate was angled backward at 10-degrees. A slug of varying size was used in the field with the diameter chosen based on the gap available between the adjacent tees. The tested connection contains a 0.75 in. round stock with an effective throat of 0.2 times the bar diameter in accordance with AWS [AWS 1992].

The performance of the conventional dry chord connection under monotonic and cyclic tension loading cases that the conventional dry chord connections were not able to attain their design capacity due to the premature failure of the weld details. In addition due to the bonded detail the connections were very stiff resulting in limited deformation capacity under both tension and shear loadings. The various failure mechanisms of the conventional dry chord connection under the tension and shear demands include yield of the anchorage bars, flexure or torsion of the faceplate, fracture of the welds, among other things.

Performance Evaluation of Enhanced Dry Chord Connection. To enhance the strength and deformation capacity of the connection a finite element (FE) model was developed and a parametric examination of weld details was undertaken by Cao (2006). The FE model was verified with experimental data and used to evaluate the sensitivity of the connection to geometry variations and changes in the welding details. To develop the intended ductile failure mechanism of anchorage bars, a parametric study was conducted to investigate the sensitivity of faceplate thickness, weld cross-section, and weld location. Preliminary design recommendations based on the evaluation results were proposed to allow the connection to achieve the desired failure mechanism. These design recommendations included the extension of weld length and mechanical debonding of anchorage reinforcement bars.

According to the design recommendations, typical examples of enhanced dry carbon chord connection details were developed and evaluated experimentally (Naito, C., Ren, R. et al 2007). Various test specimen details of pre-topped carbon chord connection and stainless chord connection were tried. Both a stainless steel chord connection and the carbon steel chord connection were developed in response to the poor performance of the conventional pre-topped dry chord connection. Both connections utilized an unbonded region to enhance the tension ductility and to allow for shear compliance i.e., shear movement with low force resistance. The "Carbon" chord was fabricated from ASTM A36 plate and ASTM A706 reinforcement. The "Stainless" chord was fabricated from type 304 stainless plate, type 316LN reinforcing bar, and 308-16 weld electrodes, which was used as an alternate to the carbon steel chord in the regions where corrosion may be a concern. All welds were conducted at room temperature using the SMAW process in accordance with AWS procedures. The welds were sized to produce failure of the reinforcement prior to the welds.

The experimental results (Naito, C., Ren, R. et al 2007) indicated that the enhanced dry chord connections had a better performance than the conventional dry chord connections, the enhanced design of a length of unbonded region worked effectively to reduce the shear stiffness of the connection until plate bearing occurs, which allowed shear compliance and increased the shear deformation capacity. However, the connections under most loading cases were not able to achieve their ultimate strength capacity. This situation was particularly apparent under a shear condition. It was attributed to failure of the connection at the bar-to-faceplate weld.

To improve the strength and ductility capabilities of the enhanced dry chord connections, an innovative design concept of ductile dry chord connection is proposed. This design uses a prefabricated module instead of a built-up welded detail between the faceplate and rebar. This design avoids potential weld failure issues previously observed. A three dimensional FE model is developed based on the new design concept and analytical studies are conducted to evaluate the performance and develop effective design details for these connections.

Design Concept. The goal of the dry chord connection design is to achieve a ductile tension response of the anchorage bars. The desired ductile mechanism cannot be formed unless each component of the connection is designed to maintain the load path without premature failure. A typical diaphragm connection consists of anchorage bars, faceplate, slug, and weld components. To ensure that ductile modes of failure occur, a general rule should be followed. Design the connection to develop a predictable yield mechanism in the targeted yield region while protecting the other components, through over-strength factors, against premature failure. For example, designing the weld, slug, faceplate and anchorage bar to have strength greater than the capacity of the yield shaft will typically provide a ductile connection with a predictable strength. An acceptable hierarchy of strengths is illustrated in FIG. 9.

The objective of the chord connection design is to achieve the targeted yield and ultimate tensile strength capacity while developing a high ductility with low cost.

Strength.

A modular system with single anchorage rebar was developed, which can be stacked laterally to resist the design loads for particular diaphragm system. In order to ensure its applicability in both moderate and high seismic regions, an appreciate strength capacity of the modular system should be designed. According to industry advices, the yield and ultimate strength capacity developed in the single modular system should be in the range of 10-kip to 20-kip.

Ductility.

Prior research showed that all of the existing dry chord connections exhibited a moderate deformability level, which could not meet the ductile demands of buildings in high seismic zones. Therefore, the new dry chord connector was targeted to fall in the high deformability category by developing a minimum 0.6 in deformation capacity (a pair of chord connector). The measurements in FIG. 1(b) are consistent with this goal, assuming standard tubular elongate steel rebar is used.

Design Detail. The design details of the new dry chord connection are presented in the figures herein. The design utilizes several special features to achieve the expected strength and deformation performance. In order to avoid the premature failure of welds located between faceplate and anchorage bars, a standard module system which serves as the connection piece between faceplate and anchorage bars is used instead of conventional weld technique. This piece can be prefabricated using cast steel and installed easily. The detail of the cast piece is illustrated in FIG. 1b. The faceplate end 30 serves the same basic connecting function as a conventional dry chord connection, and is designed to support a weld plate (aka "slug plate" or: "slug weld" or "slug") to permit the plate (slug weld) to then connect two chords together at joint, such as by welding the faceplate ends 30 to a weld plate 120. The front flange end of the connector (faceplate end 30) including the ridges 34 (as well as tube end 20) are designed to stay elastic when the anchorage bar 100 yields. The yield shaft of the middle portion 40 is designed to yield first and develop ductile deformation capacity. It is targeted to achieve 90% of its ultimate force capacity at the time when anchorage bar yields. To avoid stress concentration, transition regions 52, 58 are provided when the diameters of the connector 10 change dramatically. A mechanical debonding can be used in the front flange transition region 56 and yield shaft middle portion 40 to reduce the stiffness and provide shear compliance.

New Connection Layout. A single bar chord connection is shown in FIGS. 1-2. In this embodiment, the anchorage bar (rebar, 100 shown in FIG. 2) is inserted into the tube end 20 and welded together using slug welds 130 performed through the through-holes 26 provided as slotted end regions of the tube sidewall 22. A fillet weld 132 is used between the faceplate surface 32 and the slug at the weld plate joint to connect two panels or adjacent structures together. The number of rebar rods 100 and connectors 10 used in a panel is dependent on the force demands applied to the diaphragm system. The standard module of casting piece 10 makes it easy and flexible to fabricate and install the chord connection with multiple bars 100. An example of 3-Bar chord connection embedded in the concrete panel is as shown in FIG. 6, for example.

Design Details. The dimensions of various pieces shown in FIG. 1b are sized based on the ductile design concept and assume steel as the bar 100 and connector 10 material, such as cast steel or forged and milled steel. To achieve the strength capacity of design goal shown in FIG. 4, No. 5 rebar with yield strength of 60-ksi is recommend to use for design. The low alloy steel ASTM A706 is recommended since it limits chemical composition and carbon equivalent to enhance the weldability of the material. The rebar 100 should have a minimum yield strength of 60-ksi, the tensile strength of the rebar should be at least 1.25 times the actual yield strength. The minimum elongation of the rebar 100 is 0.14. The ASTM A615 Grade 60 steel is applicable as well only if the carbon equivalent is limited to 0.55. The anchorage rebar 100 in the design example of this dissertation research is the ASTM A706 #5 rebar with a yield strength of 60-ksi and tensile strength of 80-ksi. The nominal strength capacity of the anchorage bar is 18.6-kip.

Cast Modular System. The layout of the cast modular system is illustrated in FIG. 1b. A cast steel material with good ductility is used for design of the modular system. The desired yield strength of the middle portion 40 is around 40-ksi. There are several cast steel material candidates which have been used in recent building constructions. These options are ASTM A958 grade SC 8630; ASTM A27 grade 70-40 and ASTM A352 grade LCC. All of these options have qualification to meet the yield strength requirement. However, the first two options are not recommended due to their high carbon equivalents (>0.55), since high carbon equivalent makes the material tend to have potential weld cracks in heat affected zone according to recent research (Zimpher et al, 2008). The carbon equivalent (CE) of material can be calculated as indicated in the Equation:

$$CE = C + \frac{Mn + Si}{6} + \frac{Cr + Mo + V}{5} + \frac{Ni + Cu}{15} \qquad \text{E-1}$$

The ASTM A352 grade LCC is a good example of material that can be used for the connector in a design herein, and especially to explore and develop the maximum ductile behavior. The minimum yield strength is 40-ksi, the minimum tensile strength is 70-ksi and the maximum tensile strength is 95-ksi. The elongation should be greater than 0.22. The supplementary requirement S23 that restrict the carbon equivalent of LCC down to 0.55 should be applied for better weldability. The "skinny" part of the middle portion 40 in the cast modular system is also called a "yield shaft" because it is designed to yield before an anchorage bar 100 under tension load and develop ductile deformation capacity. This middle portion 40 is expected to achieve 90% of the minimum tensile strength of cast material when the rebar 100 yields. In an example, a material with a yield strength of 40-ksi and tensile strength of 70-ksi is used to form the connector 10. The associated calculated minimum diameter of a cylindrical the yield shaft middle portion 40 is about 0.61 in, to develop expected strength capacity, the minimum length of yield shaft portion 40 needed to develop a 0.3 in deformation capacity (for half of dry chord connection) is determined from elastic-hardening bilinear material property of cast material. The length of portion 40 should therefore be larger than 1.90 in. A length of 4 in and a diameter of 0.62 in are chosen for the yield shaft of the middle portion 40 in this design example. The yield strength capacity of this portion is around 12.0-kip and the ultimate strength capacity is 19.0-kip.

To prevent other elements of the connection from failure and ensure the desired ductility, capacities of other connector 10 components are designed to exceed the bar design capacity $\Omega R_n$, where $\Omega$ is the overstrength factor and $R_n$ is the nominal strength capacity of the anchorage bar, which is equal to 18.6-kip for single No. 5 anchorage bar 100.

In a preferred embodiment, an overstrength factor of $\Omega=1.25$ is used for the design of the connector 10 as a cast modular system, except the transitional middle portion 40 (aka "skinny" part). The front flange of transition region 56 has a diameter of 0.86 in and a fillet with a radius of 0.17 in is used at the end tip of front flange to smooth the stress flow. The length of the front flange transition region 56 is set as equal to the diameter of 0.86 in according to Saint-Venant's Principle. A transition cone region with a length of 0.2 in is used to connect the yield shaft and front flange. The interior diameter of the opening 24 of tube end 20 is set as 0.75 in, which is able to accommodate No. 5 rebar properly. The minimum exterior diameter of the tube sidewall adjacent the tube end 20 is about 1.1 in based on calculation. An exterior diameter of 1.2 in and a length of 2.5 in are used for tube in the design. A transition region is used to connect tube end 20 and the middle portion 40 including the yield shaft. The middle portion 40 region can be divided into two parts. One part is a transition region 52 that comprises a solid cylinder with a diameter of about 1.2 in and length of 0.25 in, adjacent the tube end 20. The other part is a cone region of region 52 with a top diameter is 0.62 in and bottom diameter of 1.2 in to connect the middle portion 40 yield shaft and the solid cylinder of region 52. The length of this part is about 0.4 in. These transition regions are used wherever the dimension changes dramatically to avoid stress concentration Faceplate. The faceplate end 30 can be premade with the modular system. Its strength is computed according to the base metal strength as shown in the Eq. 2:

$$R_p = f_p t_p L_p \qquad \text{Eq.-2}$$

Where $L_p$ is the plate length and $t_p$ is thickness of the plate. $f_p$ is the strength of plate which is equal to 60% of the tensile strength of plate, $0.6\, f_{up}$, for the fillet weld. The tensile strength used for faceplate is 70-ksi; same overstrength factor of 1.25 is used for faceplate design. The required plate length $L_p$ should be larger than fillet weld 132 length. It is assumed to be 3 in, therefore the minimum thickness should be determined according to the Eq.-3, where $\phi_p$ is the resistance factor for the faceplate, which is 0.75 for fillet weld 132. The determined minimum faceplate thickness is 0.25 in. A thickness of ⅜ in. is used for this design. The faceplate height can be considered as half of the panel thickness, which is 2 in. Therefore, a dimension of 3×2×⅜ in. is used for faceplate design.

$$t_p \geq \frac{\Omega R_n}{\phi_p f_p L_p} \qquad \text{Eq. -3}$$

Slug.

The slug weld is used to connect a pair of dry chord connectors, such as to a weld plate 120, at the joint. Similar to faceplate, the slug strength is also computed according to the base metal strength as shown in Eq. The material ASTM A36 is recommended for slug plate, the minimum yield strength is 36-ksi and minimum tensile strength is 58-ksi. The elongation should be greater than 0.20. An overstrength factor 1.50 is used for slug design. The slug length is assumed to be the same as faceplate length of 3 in. The required minimum thickness of slug determined from Eq.-3 is 0.35 in. A thickness of ⅜ in. is chosen for design. The width of slug is assumed as 1.5 in. cross the joint. Therefore, a dimension of 3×1.5×⅜ in. is used for slug design.

Welds. In a preferred embodiment of the rebar to tube weld design, Two slots are designed on the tube to perform plug welds between rebar and tube. The relative slots location on the tube is illustrated in FIG. 1b. In this design, the two slots are located at the left and right side of vertical axis with an angle of 60 degree separately. The strength capacity of slug weld 130 is computed as the product of the faying surface (nominal cross section) and the stress on that area (Eq.-4).

$$T_w = 0.75 * 0.6 * F_{EXX} A_{faying} \qquad \text{Eq.-4}$$

An overstrength factor of 1.5 is used for weld design. The electrode E7018 with a tensile strength of 70-ksi is recommended for weld material. According to the specification in LRFD weld section (AISC 2006), a slot width of ⅜ in. is chosen and the minimum required length is calculated as 0.89 in. at both sides. The final design chooses a slug weld 130 go through the thickness of cast tube with a base width of ⅜ in. and a length of 1 in. Two semicircular with a diameter of weld width are required at the two ends. The top width of the slug weld 130 is extended to ½ in. for ease fabrication according to industry advises.

Faceplate to Slug Weld Design.

Fillet weld 132 is used to connect faceplate end 30 and weld plate 120. The electrode E7018 with a tensile strength of 70-ksi is recommended for weld material. According to the specification in LRFD weld section (AISC 2006), the required minimum thickness is 3/16 in. For this design, a thickness of ⅜ in. is assumed and an overstrength factor of 1.50 is used. The calculated required fillet weld length is 1.89 in. A fillet weld length of 3 in. is chosen for design. The final design of the fillet weld used is ⅜@3 in. with E7018 electrode. The desired location of fillet weld is that the center of slug is placed in line with the center of other connection components such as faceplate, tube and rebar etc, since no additional flexural demand will be generated in the yield shaft based on simple free body diaphragm (FBD) analysis.

Vertical eccentricity often occurs when the slug is improperly placed in the field. This weld offset produces additional tension demand on all the components of connector due to the generation of flexure. The additional tension has the potential to initiate premature fracture of the connector 10 at a tension demand less than ultimate capacity. The sensitivity of connector performance to the offset will be evaluated through the FE analysis. To avoid significant offset of weld location in field work, two ridges 34 prefabricated with the faceplate end 30 and placed on faceplate surface 32 are preferred to locate the slug weld plate in the acceptable position.

The goal of new dry chord connection strength capacity is in the range of 10-kip to 20-kip, and the design goal of connection deformation capacity is in HDE category with at least 0.6 in. for a connection pair. The dimensions of an example new dry chord connection are presented previously herein. Based on the design detail of this example, the expected performance is that the yield shaft yields first before rebar yield, the strength of yield shaft is close to 90% of its ultimate strength when the rebar yield, and the connection failed by the failure of yield shaft. The faceplate, tube, slug and welds are in elastic region when the failure occurs. The expected yield strength capacity is 12.0-kip and the expected ultimate strength capacity is 19.0-kip. At the time when the rebar yields, the total strain developed in the yield shaft is about 0.15. Therefore a 0.6 in. deformation capacity is expected to develop in the 4 in. length yield shaft for half of a connection pair.

As discussed previously, the ideal position will be the center of slug is in line with the center of standard modular system based on simply free body diaphragm (FBD) analysis. However, the results of FE analysis show that adding vertical eccentricity between the slug and the anchorage bar does not necessarily initiate premature failure.

The performance of connector assembly which includes rebar, standard modular system, fillet weld and slug in all of the cases at a same time step during loading is shown in FIG. 9. Both deformed shape and undeformed shape are shown for comparison. A deformation scale factor of 100 is used in all of the cases for better illustration. It is noted that concrete panel is also analyzed with the connector, however the performance of the concrete panel is not shown here due to the deformation of connector is limited in the gap between yield shaft and concrete panel. The results show that adding vertical eccentricity between the slug and the anchorage bar causes flexural moment in the anchorage bar, which can be illustrated by the stress distributions of anchorage bar in all of the cases. No flexural stress caused in the anchorage bar for the first case while the case 4 has the highest flexural stress in the rebar. This effect is not significant though. However, the performance of standard modular system is not controlled by this mode because of its high ductility. For the local modular system, the performance of yield shaft is controlled by deforming of faceplate. In the first case, the rotation of faceplate is largest, which cause the maximum flexural deformation in the yield shaft. While in the case 4, the rotation of faceplate is smallest, in turn developing minimum flexural deformation in the yield shaft.

Since the design of the new dry chord connection is to develop yielding and plastic deformation in the yield shaft instead of anchorage bar as in the conventional chord connection, therefore the performance of local components should be evaluated carefully by using FEM techniques.

The nonlinear load-displacement analyses, including both material inelasticity and contact behavior, are conducted to evaluate the performance of new developed dry chord connection.

Analytical Tension Behavior. In precast diaphragm systems, chord elements are used at the ends of the DT members to resist flexural in-plane demands. Therefore, the strength and deformation capacities of chord connector under tension load are critical criteria to evaluate the connector. As discussed, the connector performance under tensile loading may be affected by the vertical location of faceplate-to-slug weld. The ideal position will be the center of slug is in line with the center of standard modular system based on simply free body diaphragm (FBD) analysis. However, the actual connector behavior is complex when subjected to incremental tensile loading and may not be well represented by the simple FBD analysis. Hence the performance of new dry chord connector subjected to uniform tensile loading is analyzed using the FE model described herein.

Figure 10:
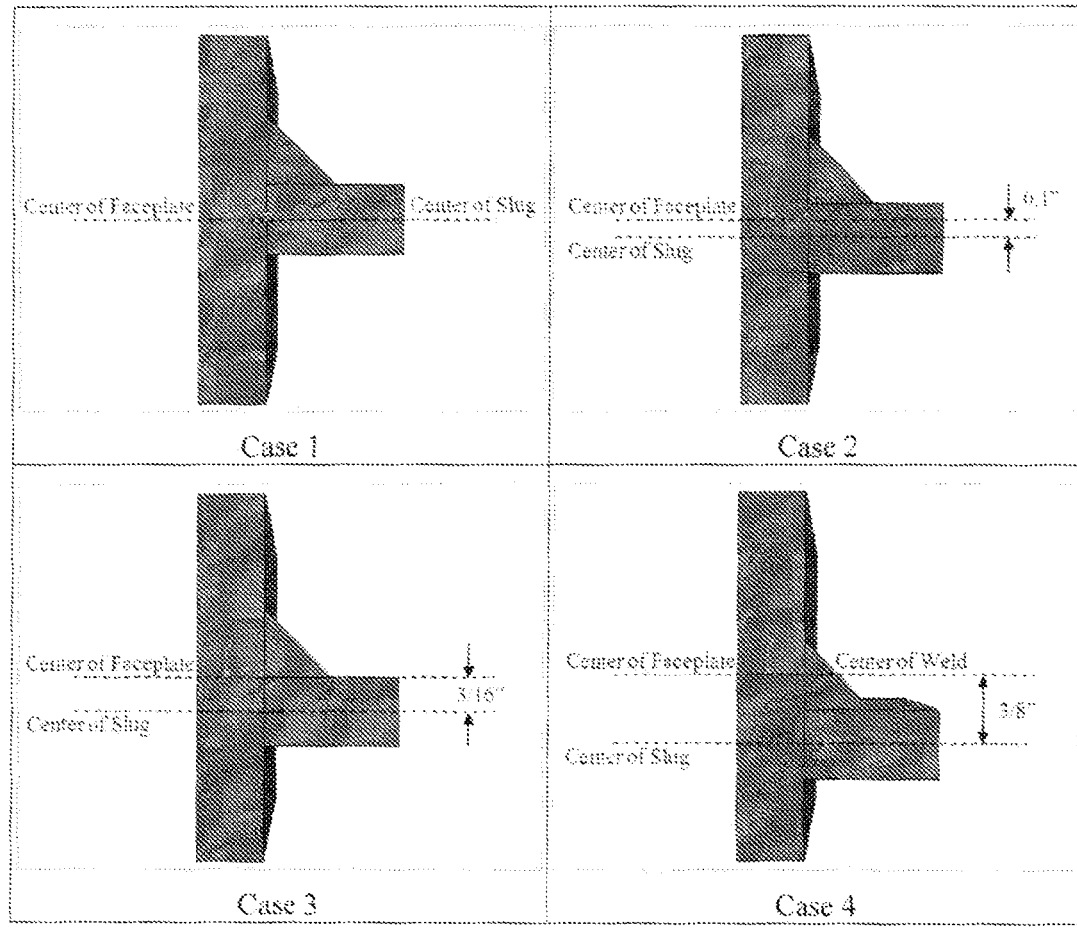
FIG. 10 illustrates the alignment of faceplates and weld plates ("slugs") in accordance with the present invention.

In addition, the connector behavior may be sensitive to the vertical weld offset due to the design involves a very flexible and thin portion" yield shaft". To develop the intended tensile mechanism of yield shaft, a parametric study is conducted with the goal of minimizing flexure and maximizing ductility in the yield portion of standard casting modular system. In FIG. 10, the sensitivity of faceplate-to-slug weld plate location is investigated. The weld location alters the deformation demands on the connection components. To illustrate this effect, connection performance of four cases with different weld locations are examined. The center of faceplate is line with the center of slug in case 1, the vertical offset in downside direction is 0.1 in. for case 2, considering the location in case 1 is the reference location. The center of faceplate in case 3 is in line with the bottom of weld, which means the vertical offset in downside direction is 3/16 in. The center of faceplate in case 4 is in line with the center of faceplate-to-slug weld, which means the vertical offset in downside direction is 3/8 in. The vertical location of faceplate-to-slug weld for each case is illustrated in FIG. 11. The nonlinear load-displacement analyses, including both material inelasticity and contact behavior, are conducted to evaluate the performance of new developed dry chord connection.

Analytical Tension Behavior. In precast diaphragm systems, chord elements are used at the ends of the DT members to resist flexural in-plane demands. Therefore, the strength and deformation capacities of chord connector under tension load are critical criteria to evaluate the connector. As discussed, the connector performance under tensile loading may be affected by the vertical location of faceplate-to-slug weld. The ideal position will be the center of slug is in line with the center of standard modular system based on simply free body diaphragm (FBD) analysis. However, the actual connector behavior is complex when subjected to incremental tensile loading and may not be well represented by the simple FBD analysis. Hence the performance of new dry chord connector subjected to uniform tensile loading is analyzed using the FE model described herein. In addition, the connector behavior may be sensitive to the vertical weld offset due to the design involves a very flexible and thin portion" yield shaft". To develop the intended tensile mechanism of yield shaft, a parametric study is conducted with the goal of minimizing flexure and maximizing ductility in the yield portion of standard casting modular system. The sensitivity of faceplate-to-slug weld location is investigated herein.

The weld location alters the deformation demands on the connection components. To illustrate this effect, connection performance of four cases with different weld locations are examined. The center of faceplate is line with the center of slug in case 1, the vertical offset in downside direction is 0.1 in for case 2, considering the location in case 1 is the reference location. The center of faceplate in case 3 is in line with the bottom of weld, which means the vertical offset in downside direction is 3/16 in. The center of faceplate in case 4 is in line with the center of faceplate-to-slug weld, which means the vertical offset in downside direction is 3/8 in. The nonlinear load-displacement analyses, including both material inelasticity and contact behavior, were conducted to evaluate the performance of new developed dry chord connection.

Analytical Tension Behavior. In precast diaphragm systems, chord elements are used at the ends of the DT members to resist flexural in-plane demands. Therefore, the strength and deformation capacities of chord connector under tension load are critical criteria to evaluate the connector. As discussed herein, the connector performance under tensile loading may be affected by the vertical location of faceplate-to-slug weld. The ideal position will be the center of slug is in line with the center of standard modular system based on simply free body diaphragm (FBD) analysis. However, the actual connector behavior is complex when subjected to incremental tensile loading and may not be well represented by the simple FBD analysis. Hence the performance of new dry chord connector subjected to uniform tensile loading is analyzed using the FE model described herein. In addition, the connector behavior may be sensitive to the vertical weld offset due to the design involves a very flexible and thin portion" yield shaft". To develop the intended tensile mechanism of yield shaft, a parametric study is conducted with the goal of minimizing flexure and maximizing ductility in the yield portion of standard casting modular system. The sensitivity of faceplate-to-slug weld location is investigated.

The weld location alters the deformation demands on the connection components. To illustrate this effect, connection performance of four cases with different weld locations are examined. The center of faceplate is line with the center of slug in case 1, the vertical offset in downside direction is 0.1 in for case 2, considering the location in case 1 is the reference location. The center of faceplate in case 3 is in line with the bottom of weld, which means the vertical offset in downside direction is 3/16 in. The center of faceplate in case 4 is in line with the center of faceplate-to-slug weld, which means the vertical offset in downside direction is 3/8 in.

On the basis of the studies herein, and analytical investigation of the new developed dry chord connection, the following conclusions can be made. Known conventional dry chord connections are unable to attain a desired earthquake load and capacity due to several factors, including the premature failure of the weld details. The bonded detail resulted in a limited deformation capacity. The improved dry chord connection disclosed herein exhibits a better ductility than conventional chord connection by introducing a length of unbonded region. However, the desired ductile failure mechanism is not achieved due to failure of bar-to-faceplate weld. A ductile design concept is used to develop ductile mechanism in the connector through overstrength factors. A standard casting modular system which serves as the connection piece between faceplate and anchorage bars is used instead of conventional weld technique to avoid premature bar-to-faceplate weld failure. 3D finite element modeling can be used to simulate the new developed dry chord connection subjected to in-plane tension demands. Accurate modeling techniques involve appropriate constitutive models of the connection components. Steel behavior modeled using Von Mises yield criteria and the interface relation modeled with surface-to-surface contact behavior can identify the chord connection tension characteristics. The actual response of various components of the new developed dry chord connector is complex and cannot be accurately predicted by the simple FBD analysis. Stress concentration and distribution of faceplate, yield shaft, faceplate-to-slug weld and slug is sensitive to the vertical weld location. The local performance of these components can be improved as the vertical offset increases in the downside direction. The behavior of anchorage bar and plug weld is not sensitive to the vertical weld location. The global load-deformation relationship of the new dry chord connector is not sensitive to the weld location as long as it is located in an appropriate region. With the appropriate weld locations, the expected strength and deformation capacities could be achieved.

Further, based on the analytical studies, the following recommendations on the new dry chord connection design are made. 1) A bearing pad around faceplate is recommended to use in order to reduce the bearing stress concentration in the concrete panel and faceplate. 2) The faceplate-so-slug weld is better to be sized by considering additional flexural demands caused by eccentricity of load applied to the connection. 3) The center of faceplate-to-slug weld is recommended to be located in line with the center of faceplate to achieve a desired connection performance. 4) An allowable offset of fillet weld in field construction is (0.1 in, ⅜ in) from the center of faceplate to the center of slug when moving the weld in the downward direction.

While the principles of the invention have been described above in connection with preferred embodiments, it is to be clearly understood that this description is made only by way of example and not as a limitation of the scope of the invention.

The invention claimed is:

1. A pair of connectors for joining rods in a structure, each connector comprising:
 a. a first tube end comprising
  i. a sidewall having a first opening configured for receiving and securing a terminal end of a rod; and
  ii. at least one through-hole positioned in a circumferential portion of the sidewall through which a slug weld is applied to connect the connector to the terminal end of the rod;
 b. a second end, wherein the second end is disposed and configured for attachment to a like second end of the other connector in the pair of connectors; and
 c. a middle portion connecting the second end to the first tube end.

2. The pair of connectors of claim 1, wherein the at least one through-hole in each connector comprises two generally oval through-holes.

3. The pair of connectors of claim 1, wherein the middle portion of each connector comprises a region of each connector having the lowest yield strength.

4. The pair of connectors of claim 1, wherein the middle portion of each connector comprises a region of each connector having the lowest strength.

5. The pair of connectors of claim 1, wherein the middle portion of each connector comprises a region of each connector having the greatest stretch.

6. The pair of connectors of claim 1, wherein application of tension on the first tube end and the second end of each connector stretches the middle portion before stretching the first tube end or the second end.

7. The pair of connectors of claim 1, wherein the middle portion of each connector comprises at least one property that differs from the properties of the first tube end and the second end, the at least one property selected from the group consisting of: stretch, flexibility, strength, failure point, transferred stress, and transferred vibration.

8. The pair of connectors of claim 1, wherein the second end of each connector comprises a faceplate portion.

9. The pair of connectors of claim 1, wherein the middle portion of each connector is welded to the first tube end and the second end.

10. The pair of connectors of claim 8, wherein the faceplate portion of each connector includes a faceplate surface having surface features for securely engaging the faceplate portion of the other connector.

11. The pair of connectors of claim 10, wherein the surface features comprise at least one feature selected from the group consisting of ridges, tabs, slots, grooves, lips, and apertures.

12. The pair of connectors of 8, wherein the second end of each connector is adapted to facilitate holding a slug between the two second ends of the pair of connectors by welding the slug to each of the two second ends with fillet welds.

13. The pair of connectors of claim 1, wherein the middle portion of each connector includes at least one transition portion between the first tube end and the second end.

14. The pair of connectors of claim 1, wherein the sidewall is elongate and defines a longitudinal central axis through the first tube end, the middle portion, and the second end of each connector, and wherein a cross-sectional area of the middle portion is smaller than a cross-sectional area of the first tube end or the second end, wherein each cross-sectional area is of a cross section taken perpendicular to the longitudinal central axis.

15. The pair of connectors of claim 13, wherein the sidewall is elongate and defines a longitudinal central axis through the first tube end, the at least one transition portion, and the second end of each connector, and wherein a cross-sectional area of the at least one transition portion is smaller than a cross-sectional area of the first tube end or the second end, wherein each cross-sectional area is of a cross section taken perpendicular to the longitudinal central axis.

16. The pair of connectors of claim 15, wherein each connector comprises at least one metal selected from the group consisting of cast metals and forged metals.

17. The pair of connectors of claim 1, wherein each connector consists essentially of steel.

18. The pair of connectors of claim 1, wherein each connector consists of metal selected from the group consisting of cast steel and forged steel.

19. A cast concrete assembly comprising the pair of connectors of claim 1.

20. A connector assembly comprising:
  a. a pair of connectors, each connector comprising
    i. a first end comprising a receptacle having an open end and at least one slot positioned in a sidewall of the receptacle; and
    ii. a second end comprising a faceplate portion; and
  b. a pair of rods, each rod comprising a terminal end;
  c. wherein the terminal end of each rod is positioned within the receptacle of each connector, and the terminal end is connected to the receptacle via a slug weld applied through the at least one slot.

21. A connector assembly for connecting two rebar ends, comprising two connectors to be joined end-to-end, each connector comprising:
  a. a tube end formed of a sidewall having a first opening configured for receiving and securing one of the two rebar ends, and a second opening positioned in the sidewall of the tube end through which the rebar end is fastened to the tube end;
  b. a second end adapted for connection to a like second end of the other connector in the pair of connectors; and
  c. a middle portion connecting the second end to the tube end.

22. A connector assembly connecting opposed ends of two generally co-axial pieces of rebar, the assembly comprising two connectors, each connector comprising:
  a. a tube end comprising a first opening having dimensions that substantially conform to dimensions of the rebar end, and a second opening positioned within a side of the tube end through which the rebar end is fastened to the tube end;
  b. a second end connected to the second end of the other connector in the pair of connectors; and
  c. a middle portion connecting the second end to the tube end.

23. A method of joining two rods, the method comprising:
  a. providing two rods, each rod having an exposed terminal end;
  b. providing two connectors, each of the two connectors comprising:
    i. a first tube end comprising a sidewall having a first opening configured for receiving and securing the exposed terminal end of one of the two rods, and at least one through-hole positioned in a circumferential portion of the sidewall;
    ii. a second end; and
    iii. a middle portion connecting the second end to the tube end;
  c. inserting the exposed terminal end of one of the rods into the first opening of the first tube end of one of the connectors;
  d. connecting the first tube end of one of the connectors to the exposed terminal end of one of the rods by slug welding the terminal end to the connector through the at least one through-hole;
  e. inserting the exposed terminal end of the other of the rods into the first opening of the first tube end of the other of the connectors;
  f. connecting the first tube end of the other of the connectors to the exposed terminal end of the other of the rods by slug welding the terminal end to the connector through the at least one through-hole; and
  g. connecting the second end of one of the connectors to the second end of the other of the connectors, thereby forming a secure connection between the two rods.

24. The method of claim 23, further comprising the step of casting concrete around any of the connectors and rods to form a cast reinforced concrete assembly.

25. The method of claim 24, further comprising the step of attaching the cast reinforced concrete assembly to at least one other structural assembly.

26. The method of claim 23, wherein the connecting the second end of one of the connectors to the second end of the other of the connectors comprises attaching a slug or weld plate to the second end of each of the connectors.

27. The method of claim 23, wherein the middle portion has lower yield than either of the first tube end or the second end.

* * * * *